US011372914B2

(12) United States Patent
Kumar et al.

(10) Patent No.: US 11,372,914 B2
(45) Date of Patent: Jun. 28, 2022

(54) IMAGE ANNOTATION

(71) Applicant: Microsoft Technology Licensing, LLC, Redmond, WA (US)

(72) Inventors: Yokesh Kumar, Kirkland, WA (US); Kuang-Huei Lee, Redmond, WA (US); Houdong Hu, Redmond, WA (US); Li Huang, Sammamish, WA (US); Arun Sacheti, Sammamish, WA (US); Meenaz Merchant, Kirkland, WA (US); Linjun Yang, Sammamish, WA (US); Tianjun Xiao, Mountain View, CA (US); Saurajit Mukherjee, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/936,117

(22) Filed: Mar. 26, 2018

(65) Prior Publication Data

US 2019/0294705 A1   Sep. 26, 2019

(51) Int. Cl.
| | |
|---|---|
| *G06F 16/583* | (2019.01) |
| *G06F 16/58* | (2019.01) |
| *G06F 16/51* | (2019.01) |
| *G06F 16/538* | (2019.01) |
| *G06N 5/02* | (2006.01) |
| *G06F 16/9535* | (2019.01) |
| *G06N 20/00* | (2019.01) |

(52) U.S. Cl.
CPC .......... *G06F 16/583* (2019.01); *G06F 16/51* (2019.01); *G06F 16/538* (2019.01); *G06F 16/5866* (2019.01); *G06N 5/02* (2013.01); *G06F 16/9535* (2019.01); *G06N 20/00* (2019.01)

(58) Field of Classification Search
CPC ...... G06F 16/5866; G06F 16/51; G06F 16/54; G06F 16/56
See application file for complete search history.

(56) References Cited

U.S. PATENT DOCUMENTS

| | | |
|---|---|---|
| 7,962,500 B2 | 6/2011 | Van Zwol et al. |
| 8,204,842 B1 | 6/2012 | Zhang et al. |
| 8,429,173 B1 * | 4/2013 | Rosenberg .............. G06F 16/14 707/748 |
| 8,571,850 B2 | 10/2013 | Li et al. |
| 8,782,077 B1 * | 7/2014 | Rowley ................... G06F 16/24 707/769 |

(Continued)

OTHER PUBLICATIONS

"Cloud Vision API", Retrieved From <<https://cloud.google.com/vision/>>, Dec. 3, 2015, 8 Pages.

(Continued)

*Primary Examiner* — Ashish Thomas
*Assistant Examiner* — Jedidiah P Ferrer
(74) *Attorney, Agent, or Firm* — Rainier Patents, P.S.

(57) ABSTRACT

The description relates to diversified hybrid image annotation for annotating images. One implementation includes generating first image annotations for a query image using a retrieval-based image annotation technique. Second image annotations can be generated for the query image using a model-based image annotation technique. The first and second image annotations can be integrated to generate a diversified hybrid image annotation result for the query image.

20 Claims, 11 Drawing Sheets

(56) References Cited

U.S. PATENT DOCUMENTS

| | | | |
|---|---|---|---|
| 9,218,364 B1 | 12/2015 | Garrigues et al. | |
| 9,262,532 B2* | 2/2016 | Pueyo | G06F 16/9535 |
| 9,589,208 B2 | 3/2017 | Jing et al. | |
| 2004/0267740 A1* | 12/2004 | Liu | G06F 16/5838 707/999.003 |
| 2008/0021928 A1 | 1/2008 | Yagnik | |
| 2099/0076800 | 3/2009 | Li et al. | |
| 2010/0121566 A1* | 5/2010 | Joshi | G01C 21/3453 701/533 |
| 2011/0191374 A1 | 8/2011 | Bengio et al. | |
| 2013/0013591 A1* | 1/2013 | Hu | G06F 16/58 707/723 |
| 2014/0328540 A1* | 11/2014 | Wang | G06K 9/00476 382/173 |
| 2015/0120760 A1 | 4/2015 | Wang et al. | |
| 2016/0196350 A1* | 7/2016 | Mau | G06F 16/951 707/706 |
| 2017/0206435 A1* | 7/2017 | Jin | G06F 16/5866 |
| 2018/0121463 A1* | 5/2018 | Harel | G06F 16/43 |
| 2018/0189325 A1* | 7/2018 | Hohwald | G06F 16/5838 |
| 2019/0034994 A1* | 1/2019 | Wu | G06Q 50/01 |
| 2019/0171906 A1* | 6/2019 | Sodhani | G06F 16/5838 |

OTHER PUBLICATIONS

"Image Annotations Judgment Task", Retrieved From <<https://microsoft.sharepoint.com/teams/BingMultimedia/_layouts/15/WopiFrame.aspx?sourcedoc=%7b3B017986-8939-4839-AC91-D4501F5B32C4%7d&file=image%20Annotations%20Guidelines.docx&action=default%20https://mealplannerpro.com/member-recipes>>, Retrieved on: Jan. 5, 2018, 10 Pages.

"Meal Planner PRO", Retrieved From <<http://mealplannerpro.com/recipe-search-engine/Cauliflower-Tortillas_-1245874>>, Retrieved on: Jan. 5, 2018, 2 Pages.

Li, et al., "Image Annotation by Large-Scale Content-based Image Retrieval", In Proceedings of the 14th ACM international conference on Multimedia, Oct. 23, 2006, pp. 607-610.

Murthy, et al., "A Hybrid Model for Automatic image Annotation", In Proceedings of International Conference on Multimedia Retrieval, Apr. 1, 2014, 8 Pages.

* cited by examiner

IMAGE ANNOTATION

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the FIG. and associated discussion where the reference number is first introduced.

DETAILED DESCRIPTION

Overview

This description relates to improving results for image annotation and more specifically to diversified hybrid image annotation (DHIA). In general, image annotation can include generating a set of keywords (e.g., tags) for a query image to describe visual content of the image. The keywords can be associated with the query image as image annotations. The image annotations can be used to organize and locate images of interest from an image database, such as for image search systems. The image annotations can also be used in image recognition systems, to understand images better, to use text to search through a personal photograph collection, etc.

In some implementations, diversified hybrid image annotation can include constructing a diverse vocabulary for the image annotations. For example, through searching for images that are similar to the query image, and gathering metadata from the similar images, a diversified vocabulary can be built. Diversified hybrid image annotation can also include refining the diversified vocabulary by hybridizing multiple image annotation techniques. For instance, diversified hybrid image annotation can integrate image annotations from a retrieval-based image annotation technique and a model-based image annotation technique to produce a diverse and accurate set of image annotations for a given query image. Hybridizing multiple techniques can improve image annotation results by capitalizing on the different benefits of the hybridized techniques, while minimizing limitations of individual techniques. Diversified hybrid image annotation can produce a more diverse, while also accurate, image annotation result.

Scenario Example

Figure 1:
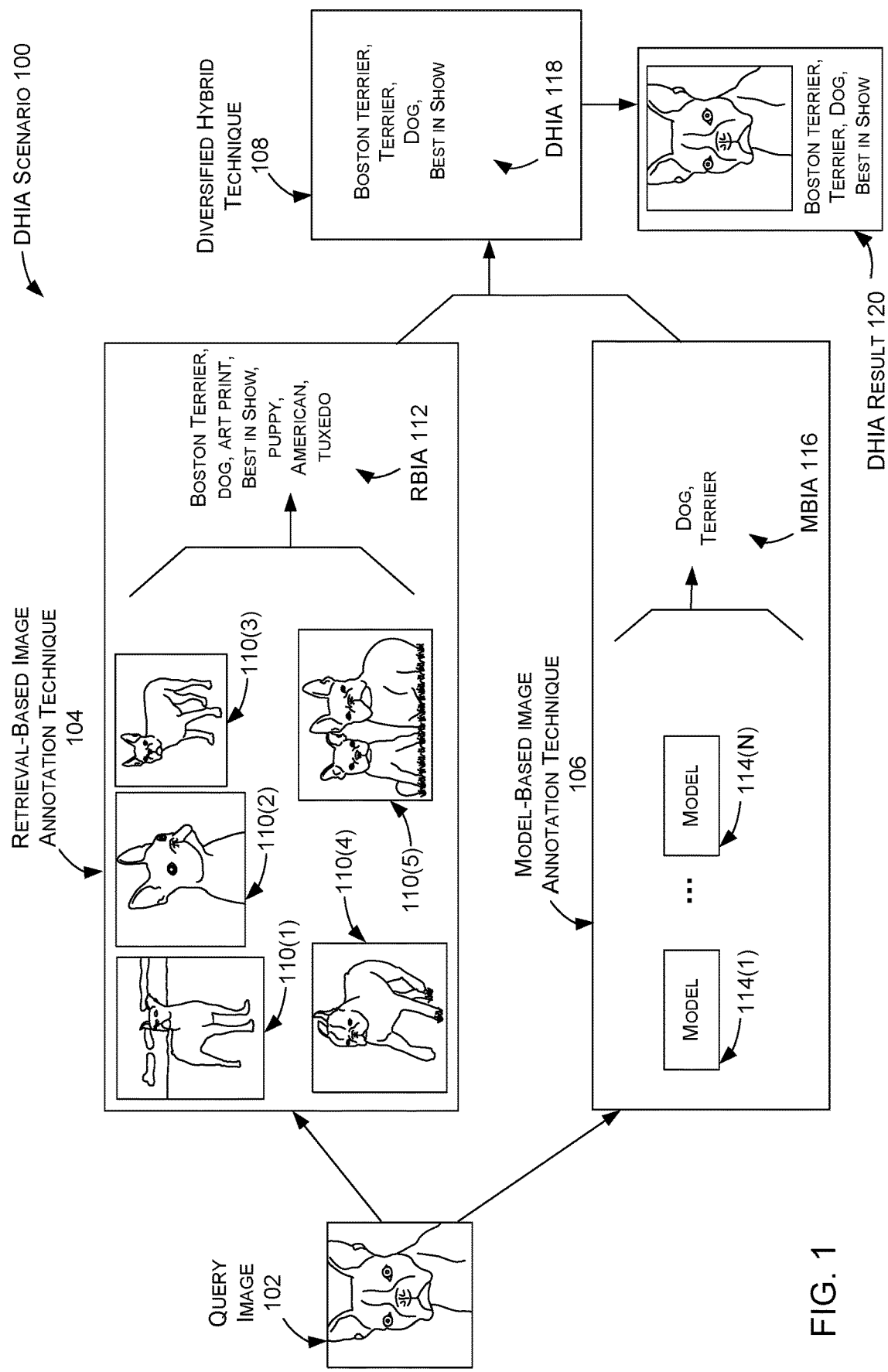
FIGS. 1-4 collectively illustrate an example diversified hybrid image annotation scenario that is consistent with some implementations of the present concepts.

FIGS. 1-4 collectively illustrate an example diversified hybrid image annotation (DHIA) scenario 100. FIG. 1 provides an overall view of scenario 100. FIGS. 2A-4 provide additional detail for portions of scenario 100. As shown in the example in FIG. 1, scenario 100 can include a query image 102 for which image annotations are desired. Scenario 100 can include a retrieval-based image annotation technique 104, a model-based image annotation technique 106, and a diversified hybrid technique 108. In this example implementation, the query image 102 can be entered into both the retrieval-based image annotation technique 104 and the model-based image annotation technique 106. Subsequently, the results from the retrieval-based image annotation technique 104 and the model-based image annotation technique 106 can be integrated with the diversified hybrid technique 108.

In the example illustrated in FIG. 1, the query image 102 includes a facial view of a Boston Terrier, which is a particular breed of dog. In some cases, the query image 102 can be selected by a user that is interested in the image. For example, the user may see the query image 102 while surfing the internet, and may be curious to find out more about the breed of dog. The user may then select the query image 102 to find out more information. In other cases the query image 102 can be selected in other ways, such as automatically by a system performing diversified hybrid image annotation. Selection of the query image will be described in more detail relative to FIG. 6, below. Selection of the query image 102 can initiate the diversified hybrid image annotation scenario 100. Initiation of the diversified hybrid image annotation scenario 100 is indicated in FIG. 1 as the arrows leading from the query image 102 to the retrieval-based image annotation technique 104 and the model-based image annotation technique 106.

Using the query image 102, the retrieval-based image annotation technique 104 can retrieve several similar images 110, such as through a search engine. The similar images 110 can include visual representations (e.g., photographs, videos, drawings) that are similar to query image 102. FIG. 1 shows five similar images 110(1)-110(5) associated with the retrieval-based image annotation technique 104. For instance, similar image 110(1) shows a Boston Terrier standing on a beach. Similar image 110(2) shows a facial view of a Boston Terrier that is different than query image 102. Similar image 110(5) shows a Boston Terrier puppy with another dog that appears older. Of course, the number of similar images 110 shown in FIG. 1 is not meant to be limiting. The retrieval-based image annotation technique 104 can retrieve virtually any number of similar images. (Note that when referring to the similar images 110 and other elements described below, parentheticals will be utilized after a reference number to distinguish like elements. Use of the reference number without the associated parenthetical is generic to the element.)

Continuing with retrieval-based image annotation technique 104, the similar images 110 can be used to generate retrieval-based image annotations 112, such as from metadata associated with the similar images 110. In the example shown in FIG. 1, the retrieval-based image annotations 112 can include words and/or short phrases. In this case, the retrieval-based image annotations 112 include "Boston Terrier," "dog," "art print," "Best in Show," "puppy," "American," and "tuxedo." As noted above for the similar images 110, the number of retrieval-based image annotations 112 shown in FIG. 1 is not meant to be limiting. Also, the particular words or phrases used in this example are intended for illustration purposes. In general, the retrieval-based image annotations 112 can be representative of visual content of the similar images 110. Although the nature of all of the retrieval-based image annotations 112 depicted in FIG. 1 will not be explained for sake of brevity, note that in this scenario, a Boston Terrier has recently (e.g., 3 days ago) won the coveted "Best in Show" prize for a nationally recognized dog show. Therefore, in this case "Best in Show" is representative of an image that includes visual content of a Boston Terrier. The retrieval-based image annotation technique 104 will be described in further detail relative to FIGS. 2A-2C, below.

In general, a benefit of retrieval-based image annotation can include generation of a relatively wide and dynamic vocabulary for image annotation. An amount of similar images that may be retrieved for any given query image does not have an inherent limit. For instance, one or multiple search engines can be used to search broadly for a great diversity of similar images. In turn, the image annotations drawn from metadata of this great diversity of similar images can offer an enormous vocabulary of potential image annotations. Stated another way, retrieval-based image annotation can produce potentially billions of image annotations for any given query image, representing a wide vocabulary. Additionally, the wide vocabulary can be dynamic. For example, the vocabulary can change and/or update with each new search for similar images. For instance, even if the same query image is subsequently provided to the same search engine, as the search engine re-indexes and/or as current events provide new image material, the same search engine can provide updated, virtually real-time similar image results. Therefore the vocabulary for image annotation with the retrieval-based image annotation technique is not limited in size and does not become stale. Referring again to scenario 100 illustrated in FIG. 1, the retrieval-based image annotations 112 are representative of a relatively wide and dynamic vocabulary for image annotation.

As shown in FIG. 1, the model-based image annotation technique 106 can use models 114 to generate model-based image annotations 116. The models 114 can be multi-label classifications, for example. In this case, the models 114 can be trained from labeled training data. FIG. 1 shows models 114(1) and 114(N), suggesting that any number of models can be used in the model-based image annotation technique 106. The models 114 and model-based image annotation technique 106 will be described in further detail relative to FIG. 3, below. The number of models 114 and/or model-based image annotations 116 shown in FIG. 1 are not meant to be limiting. In this example, the resultant model-based image annotations 116 include the words "dog" and "terrier."

In general, a benefit of model-based image annotation can include accurate image annotations, although the number of model-based image annotations produced can be relatively small. For example, models for model-based image annotation can be trained with image-annotation pairs (e.g., labeled training data) that are designated by humans, or at least confirmed by humans. The results from the models can be relatively accurate because a human may have confirmed that a particular term is representative of visual content in a particular image. Therefore, an image-annotation pair that includes that particular term paired with that particular image is likely to be relatively accurate (e.g., representative of the visual content). In contrast, image-annotation pairs that are not visually confirmed by a human have a potential to be noisy (e.g., may include visual mismatches). However, a technical problem of model-based image annotation is that it can be limited to a relatively narrow vocabulary with which the model is trained, such as thousands of potential image annotations. Developing a larger vocabulary with which to train a model can be limited by human resources.

It could be virtually impossible to collect human confirmation of billions of image-annotation pairs to train a model. Additionally, it may be computationally prohibitive to train a model with such a large vocabulary. As such, the relatively narrow vocabulary of model-based image annotation can be contrasted with the billions of image annotations available through retrieval-based image annotation.

Referring again to scenario 100 illustrated in FIG. 1, the model-based image annotations 116 "dog" and "terrier" provide a relatively good representation of the visual content of query image 102. Although the retrieval-based image annotations 112 include "Boston Terrier," which appears representative of the similar images, the retrieval-based image annotations 112 also include "art print" and "American," which are subjectively less representative of the visual content of query image 102. Thus, in this example, model-based image annotation can be viewed as more accurate than retrieval-based image annotation overall, but only offering a narrow vocabulary.

Although the model-based image annotations 116 can be relatively accurate, note that the model-based image annotation technique 106 shown in FIG. 1 did not return the particular image annotation reflective of recent events, "Best in Show." In this case, for the model-based image annotation technique 106 to have been able to return the image annotation "Best in Show," at least one of the models 114 would have had to have been retrained following the recent dog show in which the Boston Terrier won the coveted prize. As such, the model-based image annotation technique 106 can be viewed as relatively static compared to the retrieval-based image annotation technique 104. For example, another technical problem of the model-based image annotation technique 106 is that it may require retraining with new labeled training data to learn new vocabulary.

As suggested in FIG. 1, the results from the retrieval-based image annotation technique 104 and the model-based image annotation technique 106 can be integrated via the diversified hybrid technique 108. For example, the resultant diversified hybrid image annotations 118 can include "Boston Terrier," "terrier," "dog," and "Best in Show." In some cases, the diversified hybrid image annotations 118 can be accurate, diverse, and timely (e.g., up-to-date). Here, the diversified hybrid image annotations 118 include the relatively accurate annotations such as "terrier" and "dog," and also include the more detailed and timely annotations "Boston Terrier" and "Best in Show." The diversified hybrid image annotations 118 can also be somewhat culled (e.g., reduced in number). In this example, relatively less representative terms such as "art print" and "American" are not included in the diversified hybrid image annotations 118. In this manner diversified hybrid image annotation can remove superfluous or obscure image annotations, solving a potential technical problem of strictly retrieval-based image annotation. Therefore, diversified hybrid image annotation provides a technical solution by integrating the results from the retrieval-based and model-based image annotation techniques. The technical solution of diversified hybrid image annotation can benefit from both the accuracy of model-based image annotation and also the flexibility and breadth of a large, dynamic vocabulary from retrieval-based image annotation, for example.

In some cases, the diversified hybrid technique 108 can produce the diversified hybrid image annotation result 120, which can include the query image 102 together with the associated diversified hybrid image annotations 118. The diversified hybrid technique 108 and the diversified hybrid image annotation result 120 will be described in further detail relative to FIG. 4, below.

From one perspective, a wide and dynamic vocabulary for annotating a given query image can be generated by aggregating metadata from retrieved similar images to the given query image. Retrieval-based image annotation does not need special retraining for new images, current events, or vocabulary extension, thereby solving technical problems of strictly model-based image annotation. Overall accuracy of the retrieval-based image annotation vocabulary can be improved through integration with model-based image annotations, thereby solving a potential technical problem of strictly retrieval-based image annotation. The resultant diversified hybrid image annotations can potentially be the best annotations for the given query image. Stated another way, diversified hybrid image annotation can produce the best annotations for the given query image while eliminating superfluous or obscure image annotations.

Figure 2A:
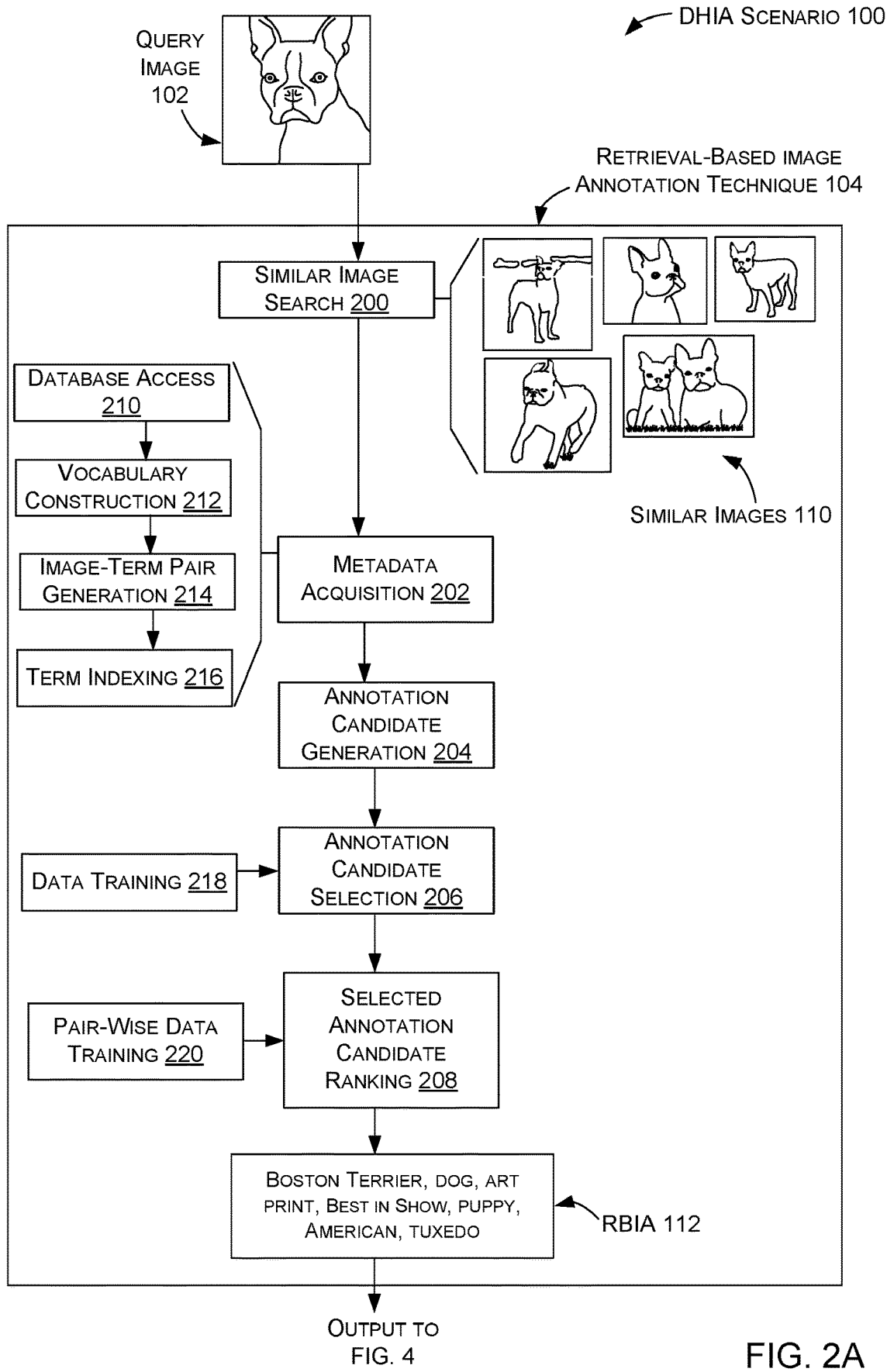
Figure 2B:
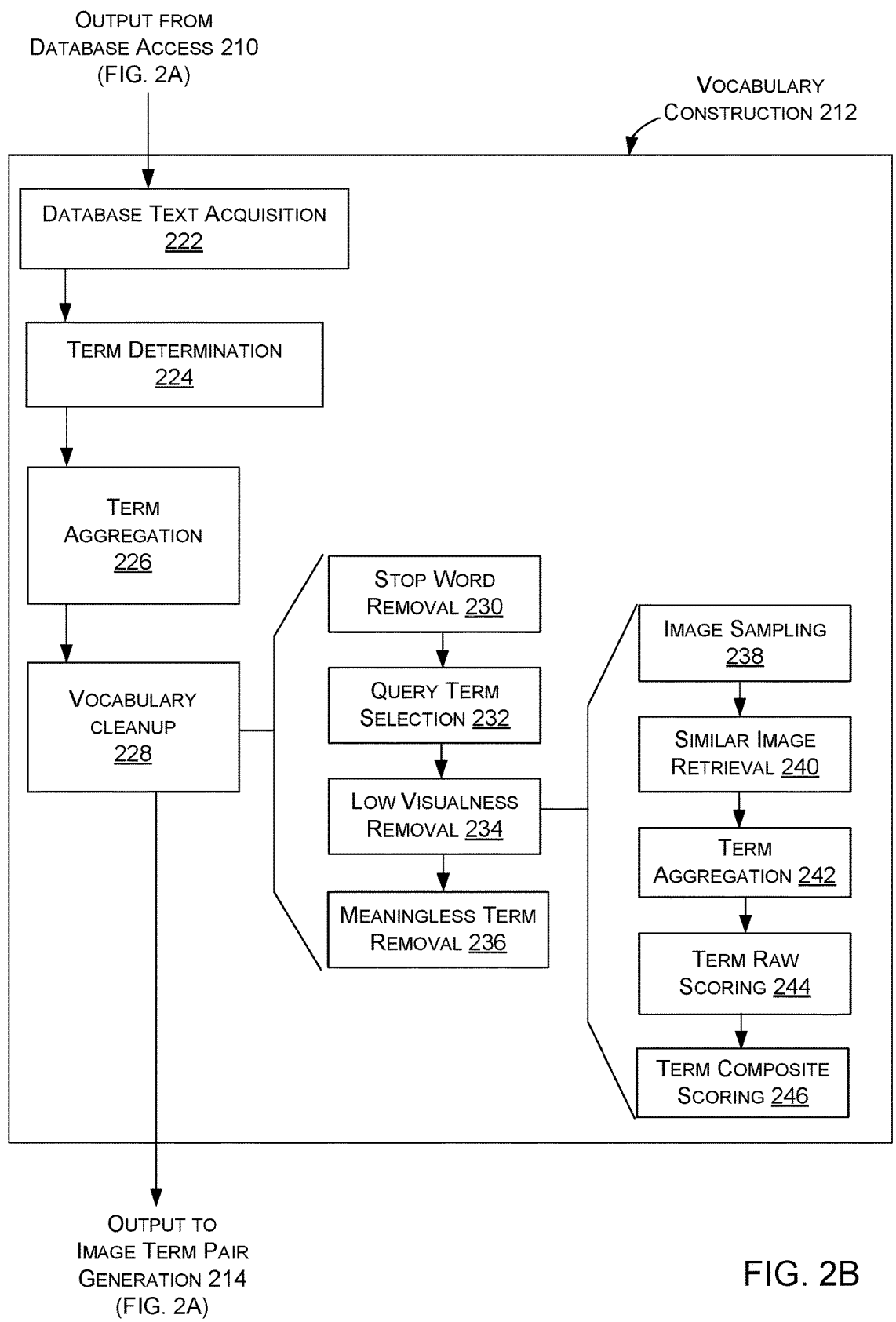
Figure 2C:
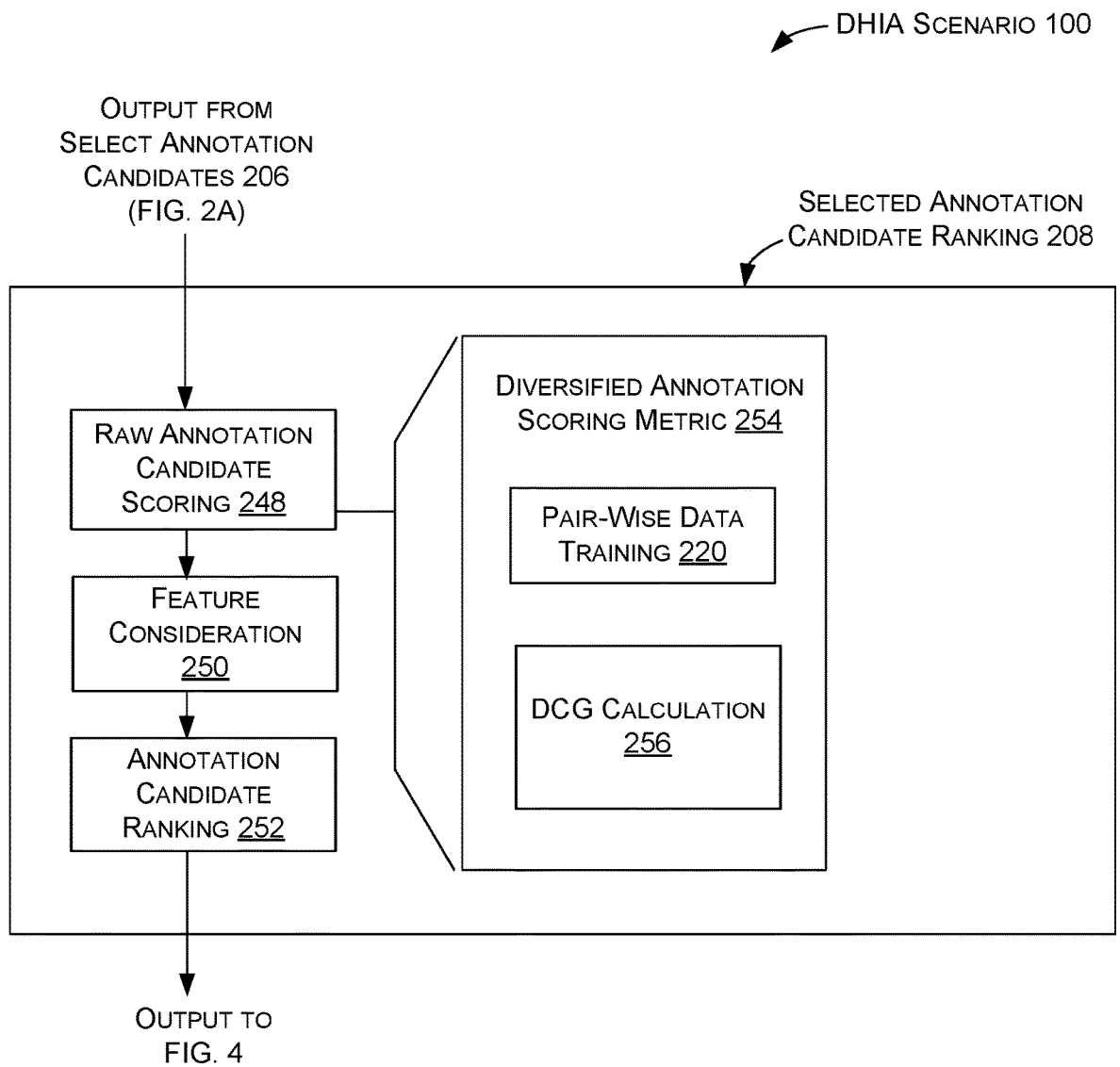

FIGS. 2A-2C collectively provide additional detail for the retrieval-based image annotation technique 104 described above. FIG. 2A starts with the query image 102, provides additional detail for retrieval-based image annotation technique 104, then concludes at the diversified hybrid technique 108. As shown in FIG. 2A, retrieval-based image annotation technique 104 can include similar image search 200, metadata acquisition 202, annotation candidate generation 204, annotation candidate selection 206, and selected annotation candidate ranking 208. In this example, metadata acquisition 202 can be fed by database access 210, vocabulary construction 212, image-term pair generation 214, and term indexing 216. Annotation candidate selection 206 can be informed by data training 218. Selected annotation candidate ranking 208 can be fed by pair-wise data training 220. FIG. 2B provides additional detail for vocabulary construction 212. FIG. 2C provides additional detail for selected annotation candidate ranking 208.

As noted above, selection of the query image 102 can initiate the retrieval-based image annotation technique 104, starting with the similar image search 200. Similar image search 200 can include determining content of the query image 102 and initiating a search based on the content. For example, metadata associated with the query image can be used to initiate a search for similar images 110. In another example, the query image 102 can be scanned using object recognition and/or facial recognition techniques to identify content of the query image 102 to use in conducting a search for similar images 110. Once the similar images 110 are identified, retrieval-based image annotation technique 104 can advance to metadata acquisition 202.

In metadata acquisition 202, metadata associated with and/or related to the similar images 110 can be acquired. In some cases, acquiring the metadata can start with database access 210. Database access 210 can include accessing a database that stores and indexes metadata related to at least a portion of the similar images 110. An example system for accessing a database will be discussed relative to FIG. 6, below. Database access 210 can be followed by vocabulary construction 212, shown in FIG. 2B.

Referring to FIG. 2B, vocabulary construction 212 can include database text acquisition 222, term determination 224, term aggregation 226, and vocabulary cleanup 228. Database text acquisition 222 can include downloading from the database the metadata that are associated with the similar images 110. In some cases, the metadata can more specifically be textual metadata. Term determination 224 can include producing distinct terms from the metadata. For example, the metadata can be broken up into distinct terms that can include individual words and/or short phrases. For instance, "terrier" can be a distinct term. Term determination 224 can also include recognizing that the individual words "Boston" and "Terrier" together are another distinct term, "Boston Terrier." Through term aggregation 226, a vocabulary of distinct terms can be generated. As noted above, the vocabulary generated can include billions of distinct terms, for instance. Finally, vocabulary cleanup 228 can be performed to remove unhelpful terms from the vocabulary.

Additional detail is shown in FIG. 2B for vocabulary cleanup 228. In this implementation, vocabulary cleanup 228 can include stop word removal 230, query term selection 232, low visualness removal 234, and meaningless term removal 236. Query term selection 232 can include selecting for terms that appear more often in search logs than terms that appear less often.

In some cases, low visualness removal 234 can include removing terms from the vocabulary that do not pertain directly to the visual content of images. Image annotations may be more appropriate when they are more directly related to the visual content of an image. To determine relative visualness of a given term, low visualness removal 234 can include image sampling 238, or sampling "n" images associated with the given term. Similar image retrieval 240 can include retrieving similar images to the sampled images for the given term. Term aggregation 242 can include collecting terms associated with the similar images to the sampled image. Term raw scoring 244 can include calculating a score for the given term. For example, each time the given term is one of the collected terms for the similar images, a "1" can be added to a raw score for the given term. Term composite scoring 246 can include dividing the raw score for the given term by "n," the number of images sampled for the given term. The composite score can be an indicator of the relative visualness of the given term. A higher composite score can indicate that the given term has a relative higher visualness. Other methods for determining and/or calculating visualness are contemplated. Low visualness removal 234 can include removing terms that have lower composite scores, or a composite score below a threshold value, for example.

Meaningless term removal 236 can include removing nonsensical or otherwise irrelevant terms. For instance, single characters can be removed from the vocabulary. In other instances, terms that contain a number, or terms that have less than three characters can be removed. In some cases, vocabulary construction 212 can reduce a vocabulary size by an order of magnitude, for example. This reduction can improve readability, improve accuracy, and/or remove meaningless terms from the potential image annotation terminology.

In the example illustrated in FIG. 2A, once vocabulary construction 212 has been performed, image-term pair generation 214 can pair terms in the vocabulary with similar images 110. Term indexing 216 can map the similar images to their paired terms.

Annotation candidate generation 204, annotation candidate selection 206, and selected annotation candidate ranking 208 can be thought of as successive steps for narrowing the terms gained through metadata acquisition 202 down to image annotation candidates that have a relatively strong likelihood of being appropriate image annotations for the query image 102. For example, each of these steps can include narrowing the annotation candidates to a smaller number of annotation candidates that better fit the query image 102. As suggested earlier, an actual number of annotation candidates can be very large. Further detail regarding processing this potentially large number of annotation candidates is provided in FIG. 2C.

As noted above, annotation candidate selection 206 can be informed by data training 218 (FIG. 2A). For example, in data training 218, a model can be trained on term-image pairs. The trained model can be capable of pre-selecting a portion of the annotation candidates. In some cases, pre-selection process can reduce the overall number of annotation candidates by removing at least some of the noisy and/or superfluous annotation candidates. In this implementation, annotation candidate selection 206 can use the trained model from data training 218 to pre-select a portion of the annotation candidates produced by annotation candidate generation 204. The pre-selected annotation candidates from annotation candidate selection 206 can then be considered in annotation candidate ranking 208.

As shown in FIG. 2C, selected annotation candidate ranking 208 can include raw annotation candidate scoring 248, feature consideration 250, and annotation candidate ranking 252. In some implementations, raw annotation candidate scoring 248 can include employing a diversified annotation scoring metric 254. The diversified annotation scoring metric 254 can include pair-wise data training 220 (introduced relative to FIG. 2A) and/or discounted cumulative gain (DCG) calculation 256.

In some cases, raw annotation candidate scoring 248 can include selecting the annotation candidates produced through annotation candidate selection 206 as the retrieval-based image annotations 112 for appending to the query image 102 when the number of annotation candidates is less than a threshold number. For example, the annotation candidates can be selected as the retrieval-based image annotations without further consideration when a number of annotation candidates is 1000 or less. Otherwise, the diversified annotation scoring metric 254 can be applied to the annotation candidates before the retrieval-based image annotations 112 are selected.

The diversified annotation scoring metric 254 can include pair-wise data training 220. In some cases, pairs of the annotation candidates produced through annotation candidate selection 206 can be formed. For example, two annotation candidates can include "$t_a$" and "$t_b$" and can be paired as "$t_a$, $t_b$." The diversified annotation scoring metric 254 can include judging if annotation candidate $t_a$ is better than annotation candidate $t_b$ for a given query image, such as query image 102 (<image, $t_a$, $t_b$>). The diversified annotation scoring metric 254 can include converting the pair-wise judgments to annotation candidate rankings for all annotation candidates for each query image. For example, annotation candidate rankings (e.g., raw scores) can be produced through discounted cumulative gain (DCG) calculation 256. Other methods for determining and/or calculating raw scores for the annotation candidates are contemplated.

As shown in FIG. 2C, selected annotation candidate ranking 208 can continue with feature consideration 250. In some implementations, feature consideration 250 can include analysis of feature gain over multiple features. For example, the features can be query-image level features, term-level features, and/or image-term features. The features can include a position-based feature of a particular annotation candidate among the similar images, for instance. In another instance, the features can include an occurrence frequency-based feature of a particular annotation candidate for the similar images. In annotation candidate ranking 252, a final ranked order of the annotation candidates from the reference set can be determined.

In some cases, a predetermined number of the highest ranked annotation candidates can be selected as the retrieval-based image annotations 112. For example, the top 1000 ranked annotation candidates from the final ranked order of the reference set can be selected as the retrieval-based image annotations 112. In another example, the number of annotation candidates selected as the retrieval-based image annotations 112 can vary based on values of the rankings. In yet another example, results from feature consideration 250 and/or other factors can be used to determine the number of annotation candidates. Alternatively, as described above, potentially all of the annotation candidates produced through annotation candidate selection 206 can be selected as the retrieval-based image annotations 112 for appending to the query image 102 when the number of annotation candidates is less than a threshold number. As shown in FIG. 2C, the retrieval-based image annotations 112 can be fed into the diversified hybrid technique 108.

Figure 3:
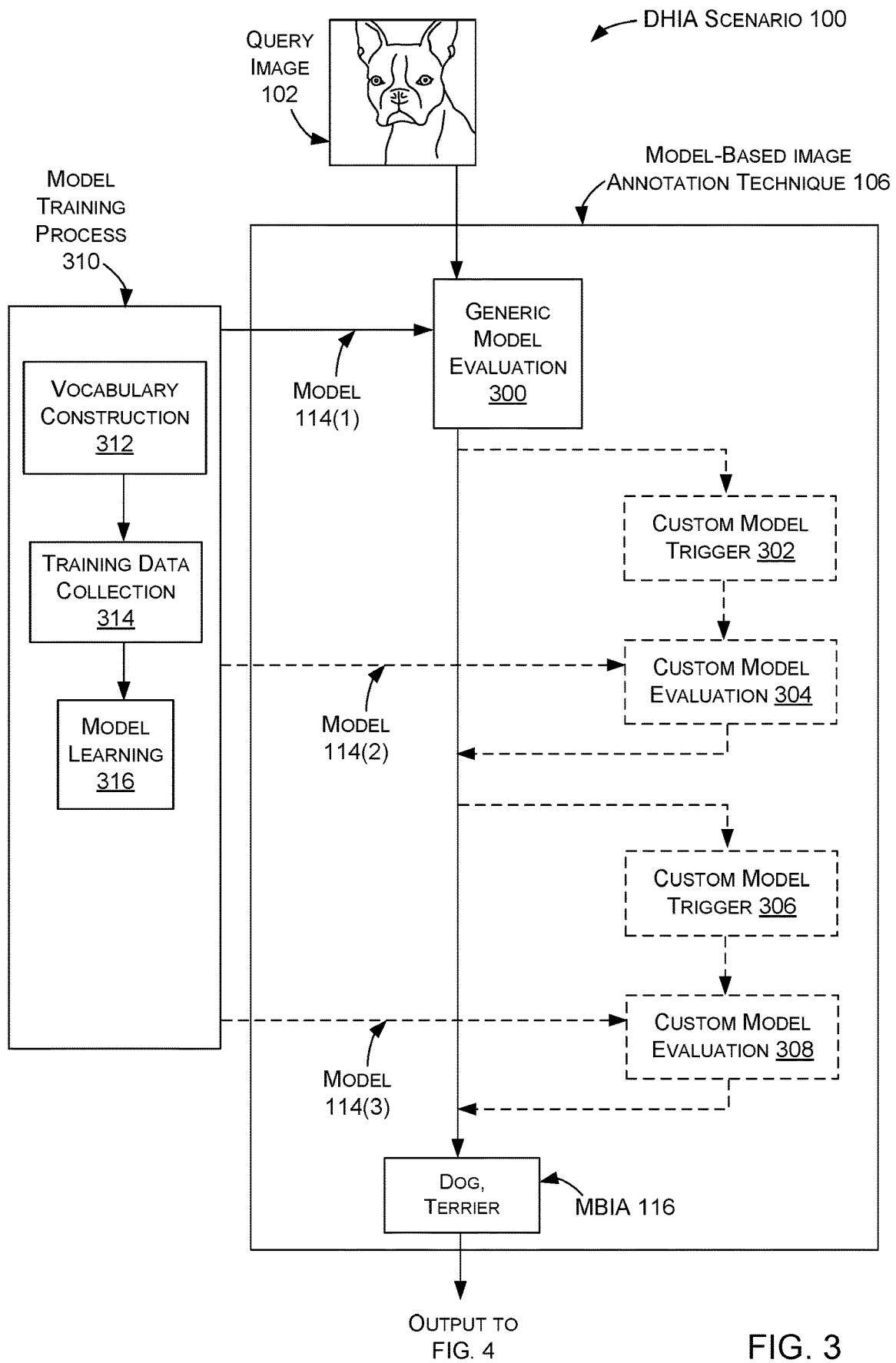

The model-based image annotation technique 106 of the example diversified hybrid image annotation scenario 100 introduced in FIG. 1 will now be described relative to FIG. 3. As shown in FIG. 3, model-based image annotation technique 106 can include generic model evaluation 300, custom model trigger 302, custom model evaluation 304, custom model trigger 306, and/or custom model evaluation 308. Generic model evaluation 300, custom model evaluation 304, and custom model evaluation 308 can use models 114. Models 114 can be produced via model training process 310. Model training process 310 can include vocabulary construction 312, training data collection 314, and model learning 316. In some cases, the retrieval-based image annotation technique 104 and the model-based image annotation technique 106 can be performed in parallel using the query image 102 as input. In other cases, these techniques can be run in series. For example, output from the retrieval-based image annotation technique 104 can be used to initiate the model-based image annotation technique 106.

In some implementations, the models 114 used in the model-based image annotation technique 106 can be multi-label classifications. The models 114 can be trained from labeled training data. The models 114 produced by model training process 310 can also be considered image annotation visual category models, for example. Referring to FIG. 3, vocabulary construction 312 can include constructing a vocabulary of categories for the models 114. The models 114 can include a finite number of categories produced during vocabulary construction 312. Here, "categories" can be thought of as potential image annotation terms. Stated another way, a category can be a word or phrase that can be selected as an image annotation (e.g., keyword).

In some cases, the vocabulary of categories can be improved for use with the model-based image annotation technique 106 by ensuring that the categories are relatively representative of visual content, and also distinct from one another. For instance, the vocabulary of categories can be improved by adding categories derived from search queries for visual images. In another instance, synonyms can be removed from the vocabulary of categories. The vocabulary of categories produced by vocabulary construction 312 can be used in training data collection 314 to produce <category, image> pairs, which can be considered labeled training data. The labeled training data can be used to train models 114. In some cases, one or more of models 114 can be deep neural network (DNN) classification models that are trained from the labeled training data.

The models 114 can be generic models and/or custom models (e.g., segment-specific models). In an example generic model, the categories can include broad categories, such as "food," "flower," "animal," and "tower." The categories can also include relatively specific categories, such as "cranberry," "stuffed tomato," and "jigsaw puzzle." A generic model can include 800, 2,200, or 5,500 categories, for example. Examples of custom models include models trained for a vocabulary centered on a particular segment (e.g., topic), such as animals, fashion, or food. In some cases, a custom model can have fewer categories (e.g., a smaller vocabulary of categories) than a generic model. For instance, a "food" custom model can have 421 food categories, and a "fashion" custom model can have 85 categories, for example.

In the example shown in FIG. 3, a generic model 114(1) produced by the model training process 310 can be used in generic model evaluation 300 to determine predicted image annotations for query image 102. Additionally or alternatively, custom models 114(2) and/or 114(3) produced by the model training process 310 can be used in custom model evaluation 304 and/or custom model evaluation 308. The use of dashed lines in FIG. 3 indicates that custom model evaluation 304 and/or custom model evaluation 308 are optional in the model-based image annotation technique 106. In FIG. 3, custom model trigger 302 can trigger the use of custom model evaluation 304. Custom model trigger 302 can include recognizing that a particular custom model is appropriate for predicting image annotations for query image 102. For example, from query image 102, generic model evaluation 300 can produce potential image annotation "dog." The generation of the word "dog" as a potential image annotation for query image 102 can trigger the use of an "animal" custom model. Similarly, custom model trigger 306 can trigger the use of custom model evaluation 308. In other cases, custom models may not be triggered. In FIG. 3, an order of the custom model trigger 302 and/or custom model trigger 306 relative to generic model evaluation 300 is not meant to be limiting, the triggers and/or model evaluation can be concurrent, sequential, and/or in series in any of a variety of orders.

Through generic model evaluation 300, custom model evaluation 304, and/or custom model evaluation 308, model-based image annotation technique 106 can produce model-based image annotations 116. In some cases, each of the models 114 can produce independent sets of model-based image annotations 116 that are output separately for use in diversified hybrid technique 108. In other cases, model-based image annotation technique 106 can include a process for compiling, integrating, and/or ranking the potential image annotations produced by the models 114 before contributing a final set of model-based image annotations 116 to diversified hybrid technique 108.

The diversified hybrid technique 108 of the example diversified hybrid image annotation scenario 100 introduced in FIG. 1 will now be described in more detail relative to FIG. 4. Diversified hybrid technique 108 can use the retrieval-based image annotations 112 and/or the model-based image annotations 116 to produce diversified hybrid image annotations 118 and/or diversified hybrid image annotation result 120. As described above, by integrating the results from multiple image annotation techniques, the diversified hybrid technique 108 can improve overall image annotation results by leveraging the advantages of the multiple techniques while also minimizing the limitations of the multiple techniques.

Figure 4:
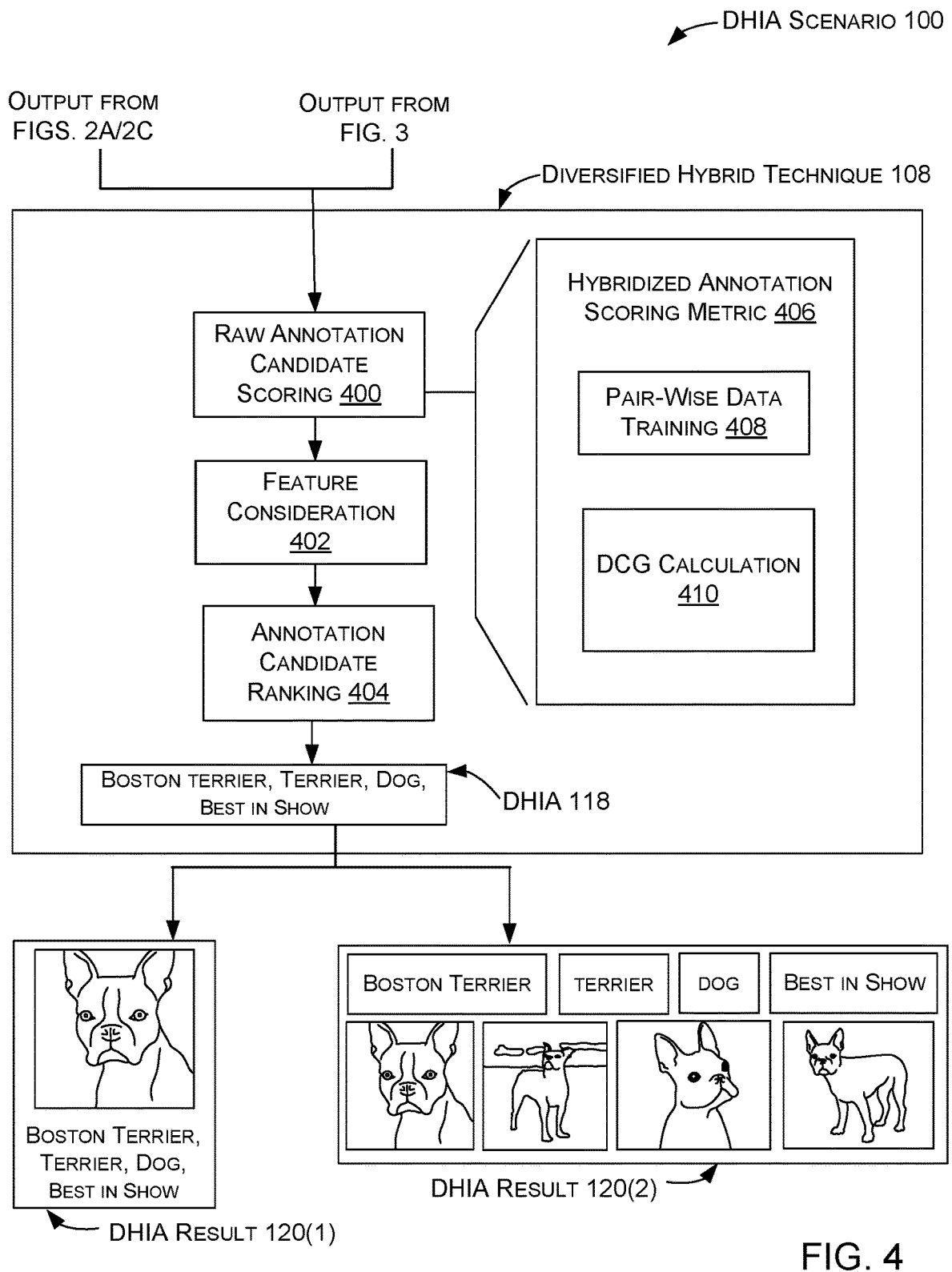

As shown in FIG. 4, diversified hybrid technique 108 can include raw annotation candidate scoring 400, feature consideration 402, and annotation candidate ranking 404. In some cases, these techniques can be similar to or potentially the same as the raw annotation candidate scoring 248, feature consideration 250, and annotation candidate ranking 252 techniques described above relative to FIG. 2C for selected annotation candidate ranking 208. In other cases, different methods for compiling, integrating, and/or ranking the retrieval-based image annotations 112 and/or the model-based image annotations 116 can be employed.

As noted above, raw annotation candidate scoring 400 can be considered similar to raw annotation candidate scoring 248. As shown in the example illustrated in FIG. 4, raw annotation candidate scoring 400 can include employing a hybridized annotation scoring metric 406. The hybridized annotation scoring metric can include pair-wise data training 408 and/or discounted cumulative gain (DCG) calculation 410. The hybridized annotation scoring metric 406 can be similar to or potentially the same as the diversified annotation scoring metric 254 described above relative to FIG. 2C. In other cases, the hybridized annotation scoring metric 406 can be different than the diversified annotation scoring metric 254.

Referring to FIG. 4, raw annotation candidate scoring 400 can include receiving the retrieval-based image annotations 112 and/or the model-based image annotations 116 as outputs from the retrieval-based image annotation technique 104 and/or the model-based image annotation technique 106, respectively. Hybridized annotation scoring metric 406 can include performing pair-wise data training 408 using the retrieval-based image annotations 112 and/or the model-based image annotations 116. Since the pair-wise data training 408 is performed using the retrieval-based image annotations 112, the corresponding annotation candidates can include the diverse vocabulary built during the retrieval-based image annotation technique 104. The annotation candidates can also include up-to-date image annotations resulting from the contemporary similar image searching in the retrieval-based image annotation technique 104. Additionally, pair-wise data training 408 can integrate the diverse and dynamic vocabulary with the relatively accurate, narrow vocabulary from the model-based image annotations 116 to ensure that the annotation candidates include potentially the best image annotations available.

In some cases, raw annotation candidate scoring 400 can include selecting the annotation candidates as the diversified hybrid image annotations 118 for appending to the query image 102 when the number of annotation candidates is less than a threshold number. In other cases, the hybridized annotation scoring metric 406 can be performed before the diversified hybrid image annotations 118 are selected. In the hybridized annotation scoring metric 406, pair-wise data training 408 can include judging if one annotation candidate is better than another annotation candidate for the query image 102. The hybridized annotation scoring metric 406 can include producing annotation candidate rankings for all annotation candidates for the query image 102. For example, discounted cumulative gain (DCG) 410 can be used to produce the annotation candidate rankings. In some cases, the annotation candidate rankings can be viewed as a probability that one annotation candidate is more similar to the query image 102 than another annotation candidate.

As shown in FIG. 4, diversified hybrid technique 108 can continue with feature consideration 402, which can be similar to feature consideration 250 described above relative to FIG. 2C. In some cases, diversified hybrid technique 108 can be viewed as using the raw scores from raw annotation candidate scoring 400 and the feature analysis from feature consideration 402 to determine which annotation candidates to leave out of the diversified hybrid image annotations 118. In this manner, diversified hybrid technique 108 can eliminate superfluous and/or obscure image annotations. In annotation candidate ranking 404, a final ranked order of the annotation candidates from the hybridized reference set can be determined. The diversified hybrid image annotations 118 can be based on this final ranked order.

In some cases, the diversified hybrid image annotation result 120 produced by diversified hybrid technique 108 can be the query image 102 together with the diversified hybrid image annotations 118. In some implementations, the diversified hybrid image annotation result 120 can be provided to a user. In a first example diversified hybrid image annotation result 120(1) shown in FIG. 4, the query image 102 can be presented to a user via a display in association with the diversified hybrid image annotations 118. For instance, the diversified hybrid image annotations 118 can be shown next to the query image 102 in a graphical user interface (GUI) on a display. Presentation and/or design of the diversified hybrid image annotation result 120(1) can be informed by the diversified hybrid technique 108. In one example, an order of the diversified hybrid image annotations 118 shown in the diversified hybrid image annotation result 120(1) can be determined based at least in part on the raw scores from raw annotation candidate scoring 400 and/or on another factor from the diversified hybrid technique 108. In this example, the highest ranked diversified hybrid image annotation can be presented first in a list that is presented with the query image 102. For instance, in the diversified hybrid image annotation result 120(1), "Boston Terrier" was the highest ranked diversified hybrid image annotation.

A second example diversified hybrid image annotation result 120(2) shown in FIG. 4 includes similar images 110 (shown but not designated). In this example, the diversified hybrid image annotations 118 can be presented as a banner (e.g., horizontal strip) across a display screen, and the highest ranked diversified hybrid image annotation ("Boston Terrier," in this case) can be presented at the left-hand end of the banner relative to the drawing page. Additionally, the query image 102 can be shown first and/or more prominently than the similar images 110. For instance, in example diversified hybrid image annotation result 120(2), the banner of diversified hybrid image annotations 118 can extend across an upper portion of the display, the query image 102 can be displayed just below the banner on a left hand side of the display, and the similar images can be arranged to the right of the query image 102. Only four of the similar images 110 are shown in a single row due to space limitations on the drawing page. In other examples, additional rows of diversified hybrid image annotations 118 and/or similar images 110 can be included. Other methods of determining an order and/or presentation style for the diversified hybrid image annotation result 120 are contemplated. An example system for providing the diversified hybrid image annotation result 120 to a user will be described relative to FIG. 6, below.

In some implementations, the diversified hybrid image annotation result 120 can include associating the diversified hybrid image annotations 118 as metadata with the query image 102. For example, the query image 102 can be tagged with the diversified hybrid image annotations 118 for additional uses. Additional uses can include using the diversified hybrid image annotations 118 to organize and/or locate images, including the query image 102 and/or similar images 110, in an image database. For example, the diversified hybrid image annotations 118 can be used to find a particular image by an internet search system. In another example the diversified hybrid image annotations 118 can be used to find a particular photograph that a user has stored in their own personal photograph storage site. The diversified hybrid image annotations 118 can also be used in image recognition systems. For example, the diversified hybrid image annotations 118 can be used to identify objects or other visual content visible in an image, including people. The diversified hybrid image annotation result 120 can include mapping the diversified hybrid image annotations 118 to the query image 102. The diversified hybrid image annotation result 120 can also be stored, as described below relative to FIG. 6.

Example System

Figure 5:
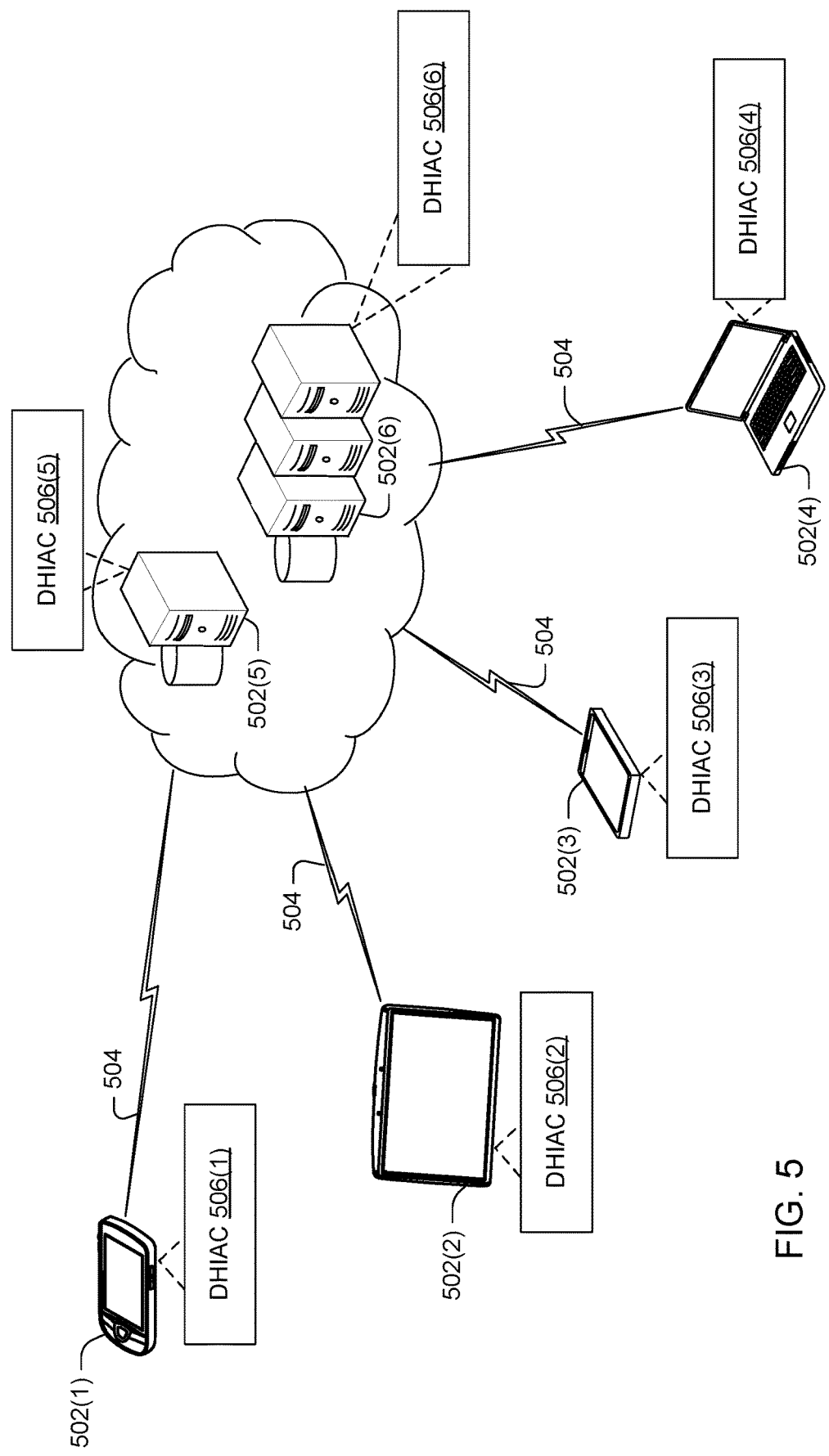
FIGS. 5 and 6 illustrate example diversified hybrid image annotation systems that are consistent with some implementations of the present concepts.
Figure 6:
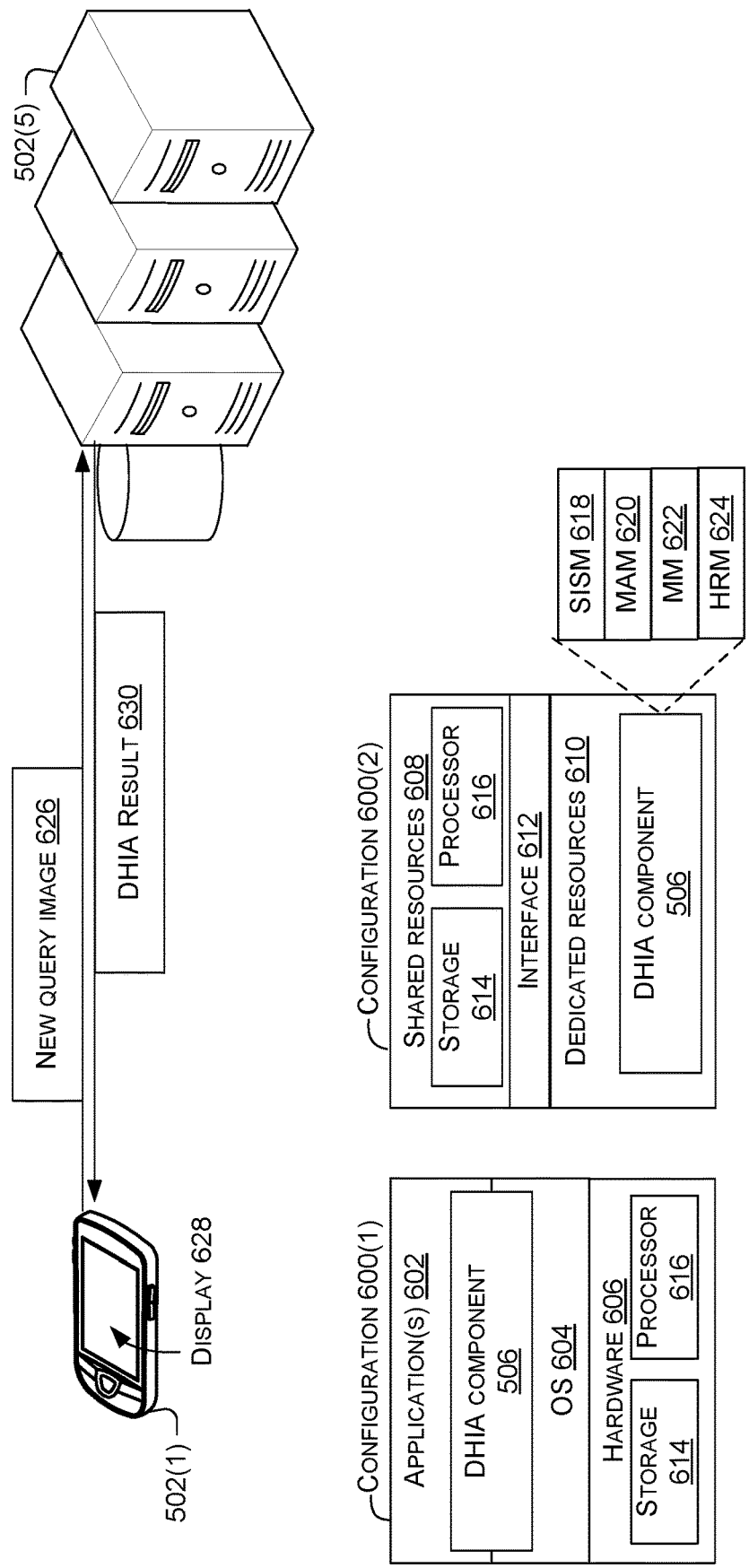

FIGS. 5 and 6 collectively show an example system 500 that can accomplish diversified hybrid image annotation (DHIA) techniques. In this example, referring to FIG. 5, system 500 can include six devices 502(1)-502(6). As illustrated in the example in FIG. 5, devices 502(1)-502(4) can communicate with devices 502(5) and 502(6) via one or more networks (represented by lightning bolts 504). In some implementations, each device 502 can include an instance of a diversified hybrid image annotation component (DHIAC) 506. (The number of illustrated devices is, of course, intended to be representative and non-limiting). In some cases parentheticals are utilized after a reference number to distinguish like elements. Use of the reference number without the associated parenthetical is generic to the element.

FIG. 6 illustrates additional details relating to components of example devices 502(1) and 502(5). FIG. 6 shows two device configurations 600 that can be employed by devices 502. Individual devices 502 can employ either of configurations 600(1) or 600(2), or an alternate configuration. (Due to space constraints on the drawing page, one instance of each configuration is illustrated rather than illustrating the device configurations relative to each device 502). Briefly, device configuration 600(1) represents an operating system (OS) centric configuration. Configuration 600(2) represents a system on a chip (SOC) configuration.

Configuration 600(1) is organized into one or more applications 602, operating system 604, and hardware 606. In configuration 600(1), hardware 606 can include storage/memory 614 and/or a processor 616, for example. Configuration 600(2) is organized into shared resources 608, dedicated resources 610, and an interface 612 there between. In configuration 600(2), shared resources 608 can include the storage/memory 614 and/or the processor 616, for example. The device can also include the diversified hybrid image annotation component 506.

In either configuration 600, the diversified hybrid image annotation component 506 can include a similar image search module (SISM) 618, a metadata aggregator module (MAM) 620, a modeling module (MM) 622, and a hybridizing ranker module (HRM) 624 (illustrated relative to configuration 600(2)). Briefly, these modules can accomplish specific facets of diversified hybrid image annotation. For example, the similar image search module 618 can be involved in searching for similar images 110 for the query image 102. The metadata aggregator module 620 can be involved in aggregating terms from metadata associated with the similar images 110. The modeling module 622 can be involved in training models 114 and/or using the models 114 to generate model-based image annotations 116. The hybridizing ranker module 624 can be involved in integrating, hybridizing, and/or ranking potential image annotations.

In some implementations, the similar image search module 618 can use the query image 102 to initiate a search for similar images 110, such as described relative to FIG. 1. The similar image search module 618 can find matching images to the query image 102 by analyzing the visual content of the query image 102. The similar image search module 618 can also obtain and/or review metadata associated with the query image 102 in order to find similar images to the query image 102.

In some implementations, the metadata aggregator module 620 can be viewed as performing the retrieval-based image annotation technique 104. For example, the metadata aggregator module 620 can use the similar images 110 produced by the similar image search module 618 to aggregate terms from metadata associated with the similar images 110, such as described relative to FIGS. 1-2C.

In some implementations, the modeling module 622 can be viewed as performing the model-based image annotation technique 106. For example, the modeling module 622 can use the query image 102 to determine model-based image annotations 116 using models 114, such as described relative to FIGS. 1 and 3.

In some implementations, the hybridizing ranker module 624 can be viewed as performing the selected annotation candidate ranking 208 as described relative to FIG. 2C, to produce the retrieval-based image annotations 112. Additionally or alternatively, in some cases the hybridizing ranker module 624 can be viewed as performing the diversified hybrid technique 108 as described relative to FIGS. 1 and 4.

Referring to FIG. 5, instances of similar image search module 618, metadata aggregator module 620, modelling module 622, and hybridizing ranker module 624 illustrated in FIG. 6 can be located on different individual devices 502. For example, an instance of modelling module 622 can be part of the diversified hybrid image annotation component 506(6) on device 502(6). In this example, the modelling module 622 on device 502(6) can train a model 114 that can later be used to generate model-based image annotations 116. The modelling module 622 on device 502(6) can output the trained model 114 for use by other devices. In this distributed computing example, another instance of modelling module 622 can be part of the diversified hybrid image annotation component 506(5) on device 502(5). The modelling module 622 on device 502(5) can use the trained model 114 to generate model-based image annotations 116. Furthermore, the hybridizing ranker module 624 can be part of the diversified hybrid image annotation component 506(5) on device 502(5). The hybridizing ranker module 624 can combine the model-based image annotations 116 with retrieval-based image annotations 112 to produce the resultant diversified hybrid image annotations 118. In other cases, the hybridizing ranker module 624 on a device 502 can receive the retrieval-based image annotations 112 and the model-based image annotations 116 from another device 502.

In another example, a single device 502, such as device 502(5), can include a self-contained version of the diversified hybrid image annotation component 506(5) that can apply the retrieval-based image annotation technique 104, the model-based image annotation technique 106, and the diversified hybrid technique 108 to query images and produce the diversified hybrid image annotations 118. For example, referring again to the example in FIG. 6, a user can select a new query image 626 on device 502(1). In this example, the user can interact with display 628, which can be presented on a touchscreen of device 502(1). For instance, the user can select new query image 626 by touching the new query image 626 displayed on display 628. In response, device 502(1) can send the new query image 626 to device 502(5). In other cases, the diversified hybrid image annotation component 506(1) can automatically select the new query image 626 for device 502(1) to send to device 502(5). For instance, the diversified hybrid image annotation component 506(1) can automatically select the new query image 626 in response to visual content on display 628. Stated another way, the diversified hybrid image annotation component 506(1) can be triggered to select the new query image 626 and initiate diversified hybrid image annotation techniques in response to visual content that is displayed on device 502(1). In other instances, the diversified hybrid image annotation component 506(1) can automatically select the new query image 626 in response to audio content received by device 502(1) and/or a textual search query received or generated on device 502(1), for example.

In the example illustrated in FIG. 6, the similar image search module 618 can search for similar images to the new query image 626 (such as similar images 110 shown in FIG. 1). The metadata aggregator module 620 can aggregate and/or index the metadata from the similar images to develop candidate image annotations (such as described relative to FIG. 2B). The modelling module 622 can generate model-based image annotations using existing trained models, for instance. The hybridizing ranker module 624 can generate the diversified hybrid image annotation result 630. Device 502(5) can send the diversified hybrid image annotation result 630 to device 502(1). Device 502(1) can then display the diversified hybrid image annotation result 630 to the user via display 628. Device 502(1) can also store the diversified hybrid image annotation result 630 on storage 614.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 502 can include traditional computing devices, such as personal computers, desktop computers, servers, notebook computers, cell phones, smart phones, personal digital assistants, pad type computers, mobile computers, appliances, smart devices, IoT devices, etc. and/or any of a myriad of ever-evolving or yet to be developed types of computing devices.

As mentioned above, configuration 600(2) can be thought of as a system on a chip (SOC) type design. In such a case, functionality provided by the device can be integrated on a single SOC or multiple coupled SOCs. One or more processors 616 can be configured to coordinate with shared resources 608, such as memory/storage 614, etc., and/or one or more dedicated resources 610, such as hardware blocks configured to perform certain specific functionality. Thus, the term "processor" as used herein can also refer to central processing units (CPUs), graphical processing units (GPUs), controllers, microcontrollers, field-programmable gate arrays (FPGAs), processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Note that the user's privacy can be protected while implementing the present concepts by only collecting user data upon the user giving his/her express consent. All privacy and security procedures can be implemented to safeguard the user. For instance, the user may provide an authorization (and/or define the conditions of the authorization) on his/her device or profile. Otherwise, user information is not gathered and functionalities can be offered to the user that do not utilize the user's personal information. Even when the user has given express consent the present implementations can offer advantages to the user while protecting the user's personal information, privacy, and security and limiting the scope of the use to the conditions of the authorization.

From one perspective, a diversified hybrid image annotation component can obtain similar images to a query image. The similar images can be used to generate retrieval-based image annotations for the query image. The diversified hybrid image annotation component can also generate model-based image annotations for the query image using trained models. The retrieval-based image annotations and the model-based image annotations can then be used to generate diversified hybrid image annotations for the query image.

Method Examples

Figure 7:
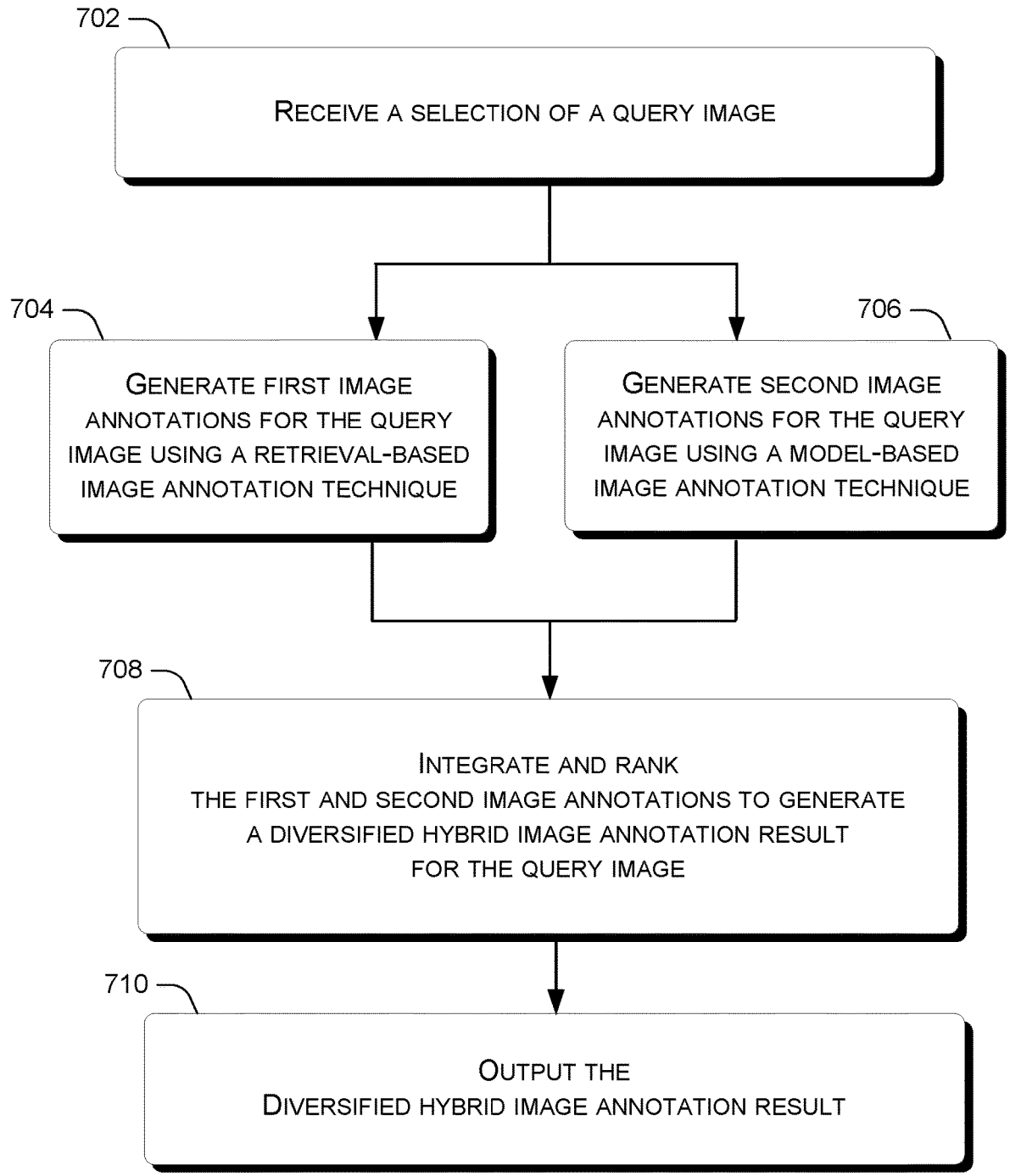
FIGS. 7-9 are flowcharts of example diversified hybrid image annotation methods in accordance with some implementations of the present concepts.
Figure 8:
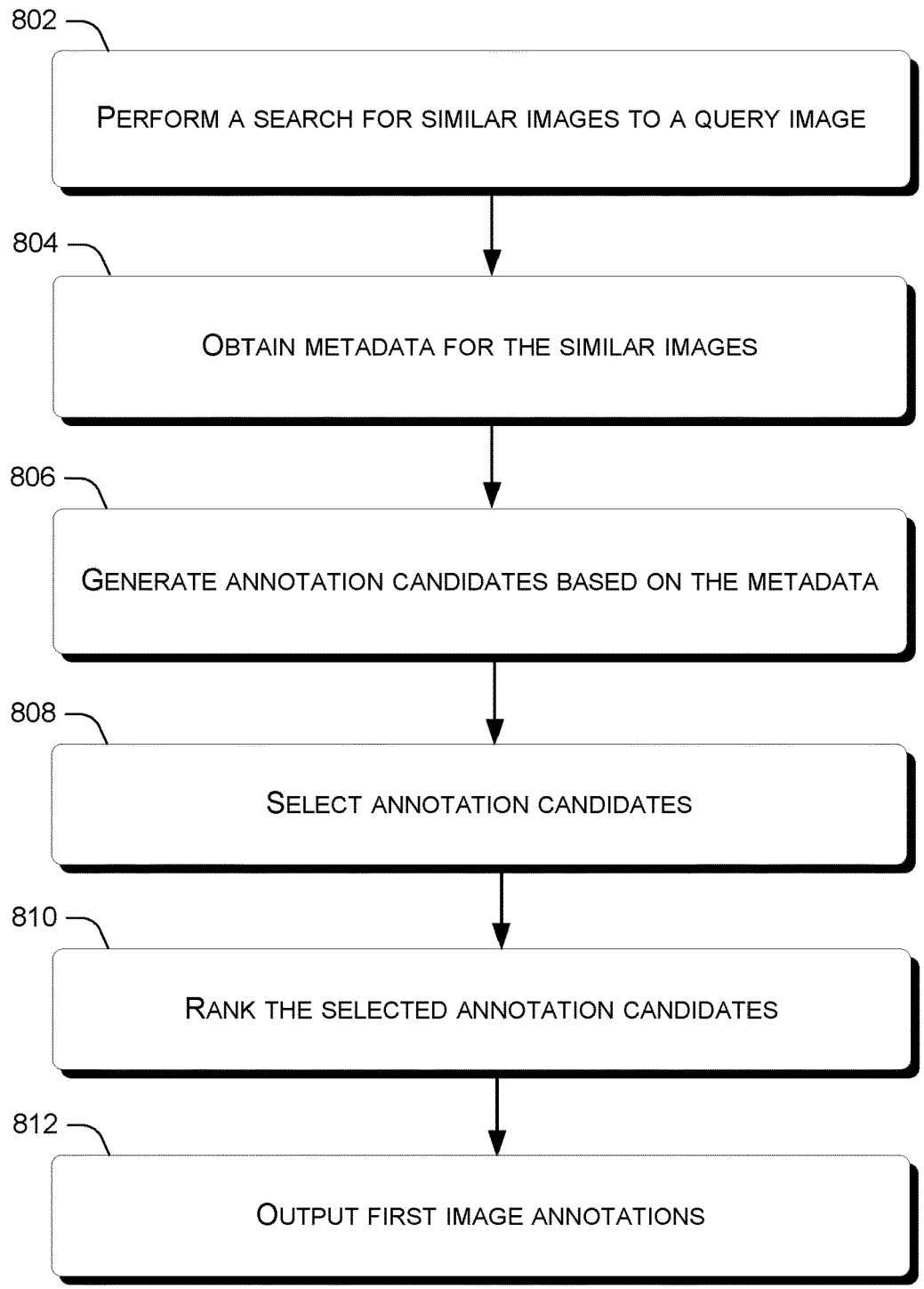
Figure 9:
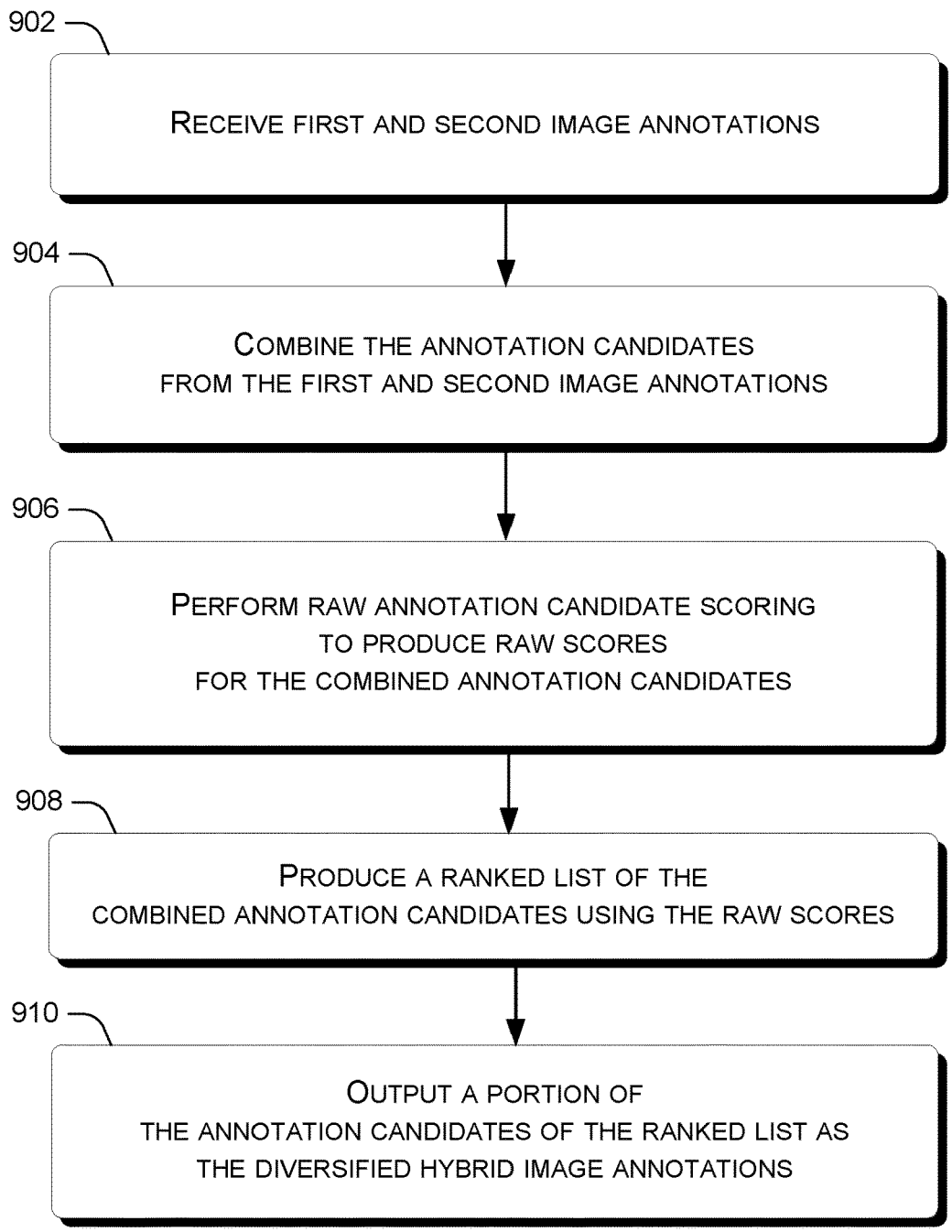

FIGS. 7-9 show example diversified hybrid image annotation methods 700-900. Generally speaking, methods 700-900 relate to generating image annotations for a query image through diversified hybrid image annotation.

As shown in FIG. 7, at block 702, method 700 can receive a selection of a query image. The selection of the query image can be made by a user. For example, the user can touch the query image which may be displayed on a touchscreen of a device of the user. In another example, the query image can be automatically selected by a diversified hybrid image annotation system or other system, such as a system that manages photographs for the user, for instance.

At block 704, method 700 can generate first image annotations for the query image using a retrieval-based image annotation technique. In some cases, the retrieval-based image annotation technique can be similar to retrieval-based image annotation technique 104 described above relative to FIGS. 1-2C. The retrieval-based image annotation technique can include retrieving similar images to the query image. In some cases, retrieving similar images can include initiating a search for similar images to the query image by sending a search query to a search engine. Method 700 can also include generating the search query based on the query image.

Continuing with block 704, the retrieval-based image annotation technique can also include obtaining textual metadata for the similar images and constructing a vocabulary from the textual metadata for the first image annotations. In some cases, the vocabulary for the first image annotations can be constructed by producing distinct terms from the textual metadata. The vocabulary can be constructed by removing low visualness terms from the vocabulary before selecting the first image annotations. In some cases, selection of the first image annotations from the vocabulary can be based on scoring from a diversified annotation scoring metric. The diversified annotation scoring metric can include a discounted cumulative gain (DCG) calculation. The diversified annotation scoring metric can include pair-wise judgments of annotation candidates from the vocabulary, for example. In some cases, selection of the first image annotations can include analysis of feature gain over multiple features. For additional detail related to block 704, see FIG. 8, described below.

At block 706, method 700 can generate second image annotations for the query image using a model-based image annotation technique. In some cases, the retrieval-based image annotation technique can be similar to retrieval-based image annotation technique 104 described above relative to FIGS. 1 and 3. For example, method 700 can generate the second image annotations for the query image using multiple trained models. In some cases, use of at least one custom trained model to generate the second image annotations can be automatically triggered based on visual content of the query image.

At block 708, method 700 can integrate and rank the first and second image annotations to generate a diversified hybrid image annotation result for the query image. In some cases, block 708 can be performed using a technique similar to the diversified hybrid technique 108 described above relative to FIGS. 1 and 4. For example, the first and second image annotations can be integrated and ranked using the hybridized annotation scoring metric. The hybridized annotation scoring metric can produce diversified hybrid image annotations. In some cases, the diversified hybrid image annotations can be part of the diversified hybrid image annotation result for the query image. For instance, the diversified hybrid image annotation result can include the diversified hybrid image annotations and the query image. For additional detail related to block 708, see FIG. 9, described below.

At block 710, method 700 can output the diversified hybrid image annotation result. In some cases, method 700 can generate a display of the diversified hybrid image annotation result. Method 700 can cause the diversified hybrid image annotation result to be displayed to a user, such as the user that selected the query image. In some cases, the diversified hybrid image annotation result can include the query image, a portion of the first image annotations, and a portion of the second image annotations. The diversified hybrid image annotation result can also include at least some of the similar images to the query image. An order of the first image annotations and/or the second image annotations can be based at least in part on rankings from the hybridized annotation scoring metric, for example.

FIG. 8 presents a second example of diversified hybrid image annotation techniques. In particular, method 800 provides additional detail regarding block 704 of method 700. From one perspective, method 800 is similar to the retrieval-based image annotation technique 104 described above relative to FIGS. 1-2C.

At block 802, method 800 can perform a search for similar images to a query image. At block 804, method 800 can obtain metadata for the similar images. At block 806, method 800 can generate annotation candidates based on the metadata. At block 808, method 800 can select annotation candidates from the annotation candidates that were generated. At block 810, method 800 can rank the selected annotation candidates. In some cases, the selected annotation candidates can be ranked using a diversified annotation scoring metric. At block 812, method 800 can output first image annotations, which can be retrieval-based image annotations.

FIG. 9 presents a third example of diversified hybrid image annotation techniques. In particular, method 900 provides additional detail regarding block 708 of method 700. From one perspective, method 900 is similar to the diversified hybrid technique 108 described above relative to FIGS. 1 and 4.

At block 902, method 900 can receive first and second image annotations. In some cases, the first and second image annotations can be similar to the retrieval-based image annotations 112 and the model-based image annotations 116 from FIG. 1, respectively. At block 904, method 900 can combine the annotation candidates from the first and second image annotations.

At block 906, method 900 can perform raw annotation candidate scoring to produce raw scores for the combined annotation candidates. The raw annotation candidate scoring can include applying a hybridized annotation scoring metric to the combined annotation candidates. In some cases, the hybridized annotation scoring metric can be a discounted cumulative gain (DCG).

At block 908, method 900 can produce a ranked list of the combined annotation candidates using the raw scores. At block 910, method 900 can output a portion of the annotation candidates of the ranked list, which can be diversified hybrid image annotations. For example, a number of the highest ranked annotation candidates can be selected as the diversified hybrid image annotations.

Methods 700-900 may be performed by a single device or by multiple devices. In one case, a single device performing diversified hybrid image annotation could perform blocks 702-710. In another case, a first device may perform a subset of the blocks, such as blocks 702 and 710, while another device could perform blocks 704-708. Examples of different devices performing portions of diversified hybrid image annotation techniques were provided above relative to FIGS. 5 and 6.

The described methods can be performed by the systems and/or devices described above relative to FIGS. 5 and 6, and/or by other devices and/or systems. The order in which the methods are described is not intended to be construed as a limitation, and any number of the described acts can be combined in any order to implement the methods, or an alternate method(s). Furthermore, the methods can be implemented in any suitable hardware, software, firmware, or combination thereof, such that a device can implement the methods. In one case, the method or methods are stored on computer-readable storage media as a set of instructions such that execution by a computing device causes the computing device to perform the method(s).

Various examples are described above. Additional examples are described below. One example includes a system comprising a processor and storage storing computer-readable instructions which, when executed by the processor, cause the processor to receive a selection of a query image. The system generates first image annotations for the query image by retrieving similar images to the query image, obtaining textual metadata for the similar images, and constructing a vocabulary from the textual metadata for the first image annotations. The system generates second image annotations for the query image using a model-based image annotation technique, integrates and ranks the first and second image annotations to generate a diversified hybrid image annotation result for the query image, and outputs the diversified hybrid image annotation result in association with the query image.

Another example can include any of the above and/or below examples where the computer-readable instructions further cause the processor to initiate a search for the similar images to the query image by sending a query to a search engine.

Another example can include any of the above and/or below examples where the computer-readable instructions further cause the processor to construct the vocabulary for the first image annotations by producing distinct terms from the textual metadata.

Another example can include any of the above and/or below examples where the computer-readable instructions further cause the processor to remove low visualness terms from the vocabulary before selecting the first image annotations.

Another example can include any of the above and/or below examples where the computer-readable instructions further cause the processor to select the first image annotations based on scoring from a diversified annotation scoring metric.

Another example can include any of the above and/or below examples where the diversified annotation scoring metric comprises a discounted cumulative gain calculation.

Another example can include any of the above and/or below examples where the diversified annotation scoring metric includes pair-wise judgments of annotation candidates.

Another example can include any of the above and/or below examples where the first and second image annotations are integrated and ranked by applying a hybridized annotation scoring metric.

Another example can include any of the above and/or below examples where the first and second image annotations are ranked based at least in part on analysis of feature gain over multiple features.

Another example can include any of the above and/or below examples where the computer-readable instructions further cause the processor to generate a display of the diversified hybrid image annotation result for presentation to a user.

Another example can include any of the above and/or below examples where the display of the diversified hybrid image annotation result includes the query image, at least some of the similar images, a portion of the first image annotations, and a portion of the second image annotations.

Another example can include any of the above and/or below examples where an order of the portion the first image annotations and the portion of the second image annotations is based at least in part on rankings from the hybridized annotation scoring metric applied to the first and second image annotations.

Another example can include any of the above and/or below examples where the computer-readable instructions further cause the processor to generate a display of the diversified hybrid image annotation result.

Another example can include any of the above and/or below examples where the display includes the query image, at least some of the first image annotations, and at least some of the second image annotations.

Another example can include any of the above and/or below examples where the computer-readable instructions further cause the processor to present the display to a user.

Another example can include any of the above and/or below examples where the computer-readable instructions further cause the processor to generate the second image annotations for the query image using multiple trained models.

Another example can include any of the above and/or below examples where the computer-readable instructions further cause the processor to automatically trigger use of at least one custom trained model to generate the second image annotations based on visual content of the query image.

Another example includes a method implemented by one or more computing devices, the method comprising receiving a query image, generating first image annotations for the query image using a retrieval-based image annotation technique, and generating second image annotations for the query image using a model-based image annotation technique. The method also comprises integrating the first and second image annotations to generate diversified hybrid image annotations for the query image and outputting the diversified hybrid image annotations.

Another example can include any of the above and/or below examples where the method further comprises causing the diversified hybrid image annotations to be displayed with the query image.

Another example includes a system comprising a processor and storage storing computer-readable instructions which, when executed by the processor, cause the processor to receive a selection of a query image, generate first image annotations for the query image using a retrieval-based image annotation technique, and generate second image annotations for the query image using a model-based image annotation technique. The system integrates and ranks the first and second image annotations to generate diversified hybrid image annotations, and causes the diversified hybrid image annotations to be displayed with the query image.

CONCLUSION

The description relates to diversified hybrid image annotation. In one example, diversified hybrid image annotation can be used to create accurate and dynamic image annotations for a query image. The image annotations can include a larger, more diverse, and more up-to-date vocabulary of annotations than available through other image annotation methods.

Although techniques, methods, devices, systems, etc., pertaining to providing image annotations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
    a processor; and
    storage storing computer-readable instructions which, when executed by the processor, cause the processor to:
        receive identification of a query image,
        generate retrieval-based image annotations for the query image by:
            initiating a search using the query image to identify images other than the query image,
            obtaining textual metadata for the identified images,
            constructing a retrieval-based vocabulary from the textual metadata,
            determining visualness scores for various terms, the visualness scores reflecting extents to which individual terms relate to visual image content;
            removing low visualness terms having corresponding visualness scores below a threshold from the retrieval-based vocabulary, and
            after removing the low visualness terms from the retrieval-based vocabulary, pairing terms from the retrieval-based vocabulary with the identified images as the retrieval-based image annotations,
        generate model-based image annotations for the query image by:
            inputting the query image to a trained model that has been trained using training images having labels selected from a model-based vocabulary that lacks at least some terms of the retrieval-based vocabulary, and
            obtaining the model-based image annotations from the trained model, wherein the trained model predicts that the model-based image annotations apply to the query image and the model-based image annotations are selected from the model-based vocabulary,
        integrate and rank the retrieval-based image annotations and the model-based image annotations to generate a diversified hybrid image annotation result for the query image, the diversified hybrid image annotation result comprising at least one of the retrieval-based image annotations and at least one of the model-based image annotations ranked relative to one another; and
        output the diversified hybrid image annotation result in response to the query image.

2. The system of claim 1, wherein the computer-readable instructions further cause the processor to:
    initiate a search for the identified images by sending the query image to a search engine that retrieves the identified images based at least on the query image,
    wherein the search engine re-indexes as new images are provided to the search engine.

3. The system of claim 1, wherein the computer-readable instructions further cause the processor to:
    select the retrieval-based image annotations based on scoring from a diversified annotation scoring metric.

4. The system of claim 3, wherein the diversified annotation scoring metric comprises a discounted cumulative gain calculation.

5. The system of claim 1, wherein the retrieval-based image annotations and the model-based image annotations are integrated and ranked by applying a hybridized annotation scoring metric.

6. The system of claim 5, wherein the retrieval-based image annotations and the model-based image annotations are ranked based at least in part on analysis of feature gain over multiple features.

7. The system of claim 5, wherein the computer-readable instructions further cause the processor to:
    generate a presentation of the diversified hybrid image annotation result.

8. The system of claim 7, wherein the presentation of the diversified hybrid image annotation result includes the query image, at least one of the identified images, the at least one of the retrieval-based image annotations, and the at least one of the model-based image annotations.

9. The system of claim 8, wherein the computer-readable instructions further cause the processor to:
order the at least one of the retrieval-based image annotations and the at least one of the model-based image annotations on the presentation based at least in part on rankings from the hybridized annotation scoring metric applied to the retrieval-based image annotations and the model-based image annotations.

10. The system of claim 1, wherein the trained model comprises a deep neural network.

11. The system of claim 10, wherein the computer-readable instructions further cause the processor to:
train the deep neural network using the training images and the labels selected from the model-based vocabulary.

12. The system of claim 1, wherein the computer-readable instructions further cause the processor to:
present the output to a user.

13. The system of claim 1, wherein the computer-readable instructions further cause the processor to:
generate the model-based image annotations for the query image using multiple trained models.

14. The system of claim 13, wherein the computer-readable instructions further cause the processor to:
automatically trigger use of at least one custom trained model to generate the model-based image annotations based at least on visual content of the query image.

15. A method comprising:
receiving identification of a query image,
generating retrieval-based image annotations for the query image by:
initiating a search using the query image to identify images other than the query image,
obtaining textual metadata for the identified images,
constructing a retrieval-based vocabulary from the textual metadata,
determining visualness scores for various terms, the visualness scores reflecting extents to which individual terms relate to visual image content;
removing low visualness terms having corresponding visualness scores below a threshold from the retrieval-based vocabulary, and
after removing the low visualness terms from the retrieval-based vocabulary, pairing terms from the retrieval-based vocabulary with the identified images as the retrieval-based image annotations,
generating model-based image annotations for the query image by:
inputting the query image to a trained model that has been trained using training images having labels selected from a model-based vocabulary that lacks at least some terms of the retrieval-based vocabulary, and
obtaining the model-based image annotations from the trained model, wherein the trained model predicts that the model-based image annotations apply to the query image and the model-based image annotations are selected from the model-based vocabulary,
integrating and ranking the retrieval-based image annotations and the model-based image annotations to generate a diversified hybrid image annotation result for the query image, the diversified hybrid image annotation result comprising at least one of the retrieval-based image annotations and at least one of the model-based image annotations ranked relative to one another; and
outputting the diversified hybrid image annotation result in response to the query image.

16. The method of claim 15, further comprising:
selecting the retrieval-based image annotations based on scoring from a diversified annotation scoring metric.

17. The method of claim 16, wherein the diversified annotation scoring metric comprises a discounted cumulative gain calculation.

18. The method of claim 15, wherein the retrieval-based image annotations and the model-based image annotations are integrated and ranked by applying a hybridized annotation scoring metric.

19. The method of claim 15, wherein the trained model comprises a deep neural network.

20. A computer-readable storage medium storing computer-readable instructions which, when executed by a processor, cause the processor to perform acts comprising:
receiving identification of a query image,
generating retrieval-based image annotations for the query image by:
initiating a search using the query image to identify images other than the query image,
obtaining textual metadata for the identified images,
constructing a retrieval-based vocabulary from the textual metadata,
determining visualness scores for various terms, the visualness scores reflecting extents to which individual terms relate to visual image content;
removing low visualness terms having corresponding visualness scores below a threshold from the retrieval-based vocabulary, and
after removing the low visualness terms from the retrieval-based vocabulary, pairing terms from the retrieval-based vocabulary with the identified images as the retrieval-based image annotations,
generating model-based image annotations for the query image by:
inputting the query image to a trained model that has been trained using training images having labels selected from a model-based vocabulary that lacks at least some terms of the retrieval-based vocabulary, and
obtaining the model-based image annotations from the trained model, wherein the trained model predicts that the model-based image annotations apply to the query image and the model-based image annotations are selected from the model-based vocabulary,
integrating and ranking the retrieval-based image annotations and the model-based image annotations to generate a diversified hybrid image annotation result for the query image, the diversified hybrid image annotation result comprising at least one of the retrieval-based image annotations and at least one of the model-based image annotations ranked relative to one another; and
outputting the diversified hybrid image annotation result in response to the query image.

* * * * *